Patented Feb. 23, 1954

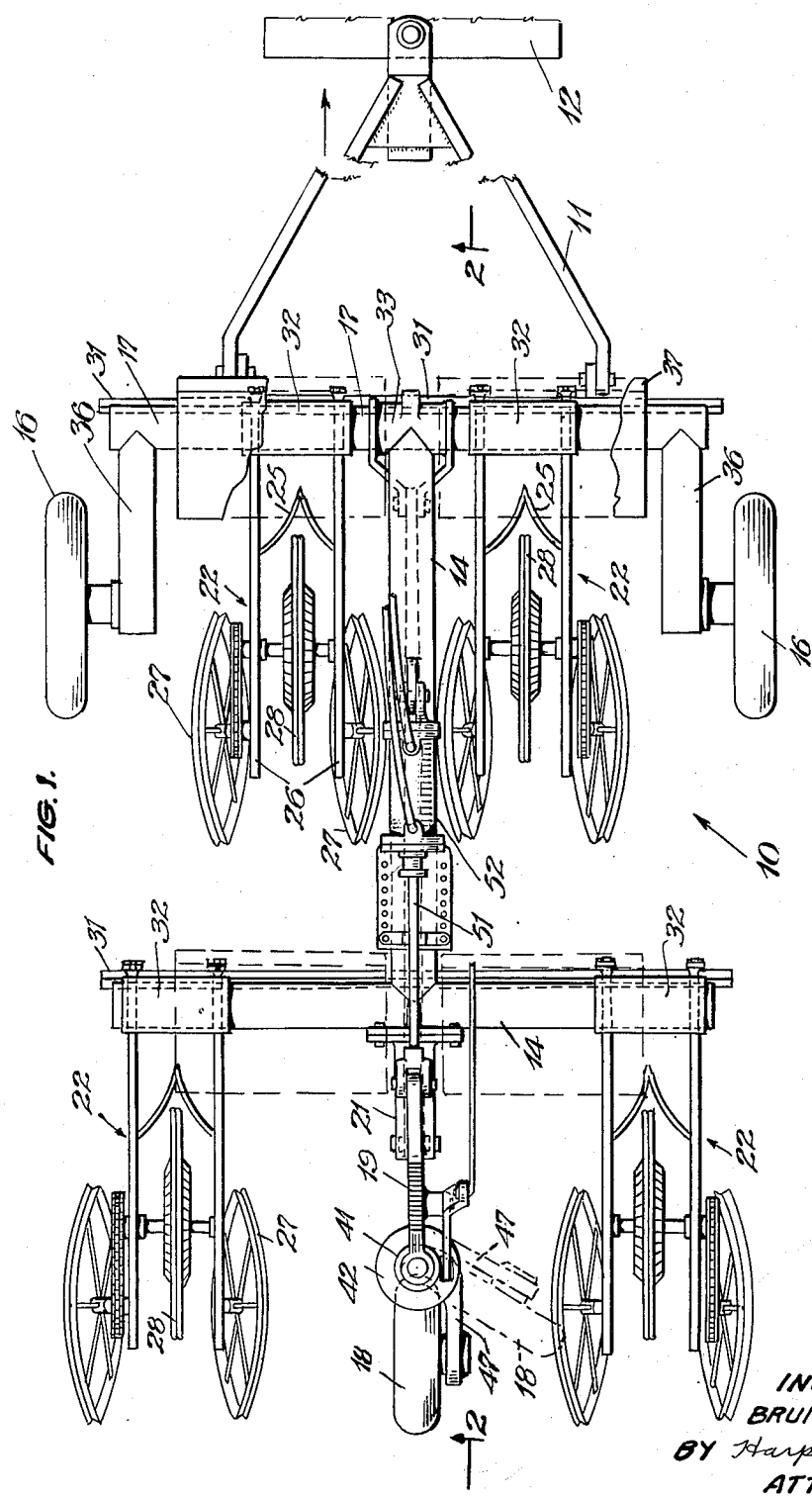

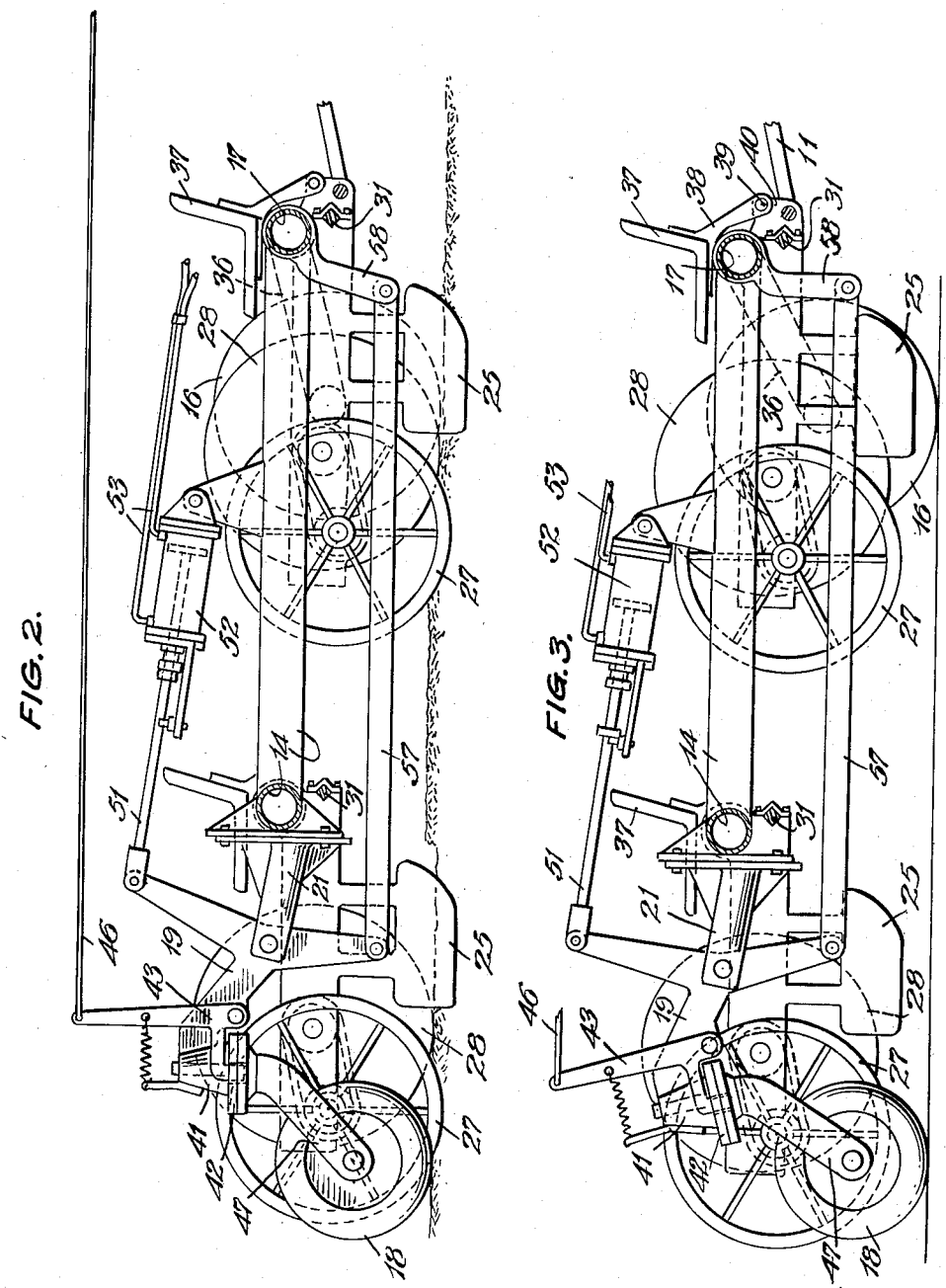

2,669,920

UNITED STATES PATENT OFFICE 2,669,920

IMPLEMENT SUPPORTING STRUCTURE

Bruno Da Valle, San Jose, Calif.

Application December 14, 1950, Serial No. 200,788

1 Claim. (Cl. 97—233)

The present invention relates to a supporting structure for connection to a draft vehicle and having means for mounting a plurality of planter units or other implements in an advantageous manner, and is concerned more particularly with a supporting structure which can be turned on a short radius at the end of the rows and which maintains a straight line movement while travelling along the rows, the planter units being lifted bodily out of the ground as a turn is made at the end of the rows.

In the planting of strawberry plants for example, it is customary to employ two men to each planter unit and insofar as conventional practice is concerned the mounting of two planter units in side-by-side relation behind the draft vehicle has been the common practice. In accordance with the instant invention four or more planter units can be mounted for planting plurality of adjacent rows of strawberries or other plants and still provide a desirable short turning radius with all of the planter units lifted out of the ground when turning at the end of the rows.

The above and other objects of the invention are attained as described in connection with a preferred embodiment of the invention, as illustrated in the accompanying drawings, in which:

Figure 1 is a plan view of the supporting structure with some parts broken away.

Figure 2 is a vertical sectional view taken on the line 2—2 in Figure 1.

Figure 3 is a view similar to Figure 2 but showing the structure adjusted to lift the planter units out of the ground.

Referring to the drawings, there is shown a supporting structure 10 connected by drawbar 11 to a draft or towing vehicle 12 such as a tractor, a fragmentary portion of which is shown in Figure 1. The supporting structure includes a horizontally disposed T-shaped frame 14 with the leg of the T extending longitudinally and with the cross bar of the T disposed rearwardly. Two front supporting wheels 16 are connected by a horizontal transverse member or pipe 17 to the leg of the T and a single rear supporting wheel 18 of the caster type mounted by means of a bell crank 19 in a bracket structure 21 on the T-shaped frame. Four planting units or ground working implements 22 of conventional construction are provided, two of these being mounted in adjustable inboard relation between the two front wheels 16 on either side of the leg of the T and two of them being mounted in an adjustable outboard relation at either side of the caster wheel 18. Each planter unit comprises a pair of frame brackets 26 on which supporting wheels 27 and a planting wheel 28 are mounted and which extend forwardly and are connected to a transverse square tool bar 31. A furrow opener 25 is positioned forwardly of each planting wheel 28. The frame members 26 of each planter unit are also connected to a sleeve 32 and the front pair of sleeves 32 are slidably journalled on the pipe 17. The transverse square tool bar or supporting element 31 is common to both of these units and serves to connect them rigidly to each other and to the end of the T-frame where the frame is pivoted at the front end on the transverse pipe 17 by a horizontally disposed bearing or journal means 33. The respective planter units are adjustably clamped to the square tool bar 31 in a conventional manner, and the bar is rigidly connected to the bearing 33.

It will be seen therefore that the two front planter units are connected to each other and to the T-frame 14 to move therewith as a unit. Also the front ground wheels 16 are secured on transversely aligned, downwardly and rearwardly extending arms or depending portions 36 from the ends of the pipe 17 so that by forward movement of the wheels 16 from the position seen in Figure 2 to the position seen in Figure 3, the front of the T-frame and the planters supported thereby will be lifted bodily from the ground. A seat structure 37 for the front pair of planters is supported by bracket means 38 on a pivot 39 on respective brackets 40 of the draft connection and rest on the transverse pipe 17 when in upright position. This seat structure can be swung forwardly to an out-of-the-way position when desired.

The rear pair of planter units 22 are adjustably mounted on the cross bar of the T and are similarly connected by a second square tool bar or transverse supporting element 31 to each other and the frame for bodily lifting movement. The cross bar of the T as previously described is provided with a bracket structure 21 which pivotally supports a three-armed bellcrank member 19 for swinging movement about a transverse axis. One rearwardly extending arm of the bellcrank is rigidly connected to a kingpin housing 41 and this kingpin housing has a flange 42 which is apertured to receive a latch lever 43 urged by spring 44 to active position about its pivot 45 on the bellcrank 19. The latch lever is controlled by a cord or line 46 from the front of the machine. A supporting arm 47 for the ground engaging caster wheel extends downwardly and rearwardly from its connection to the king pin. The caster wheel is held in straight ahead position by the latch member 41.

An upwardly projecting arm of the bellcrank 19 is connected to the piston rod 51 of a pneumatic or hydraulic cylinder 52 having lines 53 extending forwardly to the tractor. Also it will be seen that the bellcrank has a depending or downwardly projecting arm which is pivotally connected by a horizontal stiff link 57 with a pair of depending arms 58 secured to the transverse pipe 17. Thus upon operation of the cylinder the bellcrank 19 is swung rearwardly or counter-clockwise and a linkage, comprising arms 58 and link 57 and the downwardly projecting arm of bellcrank 19 is employed to urge both the front wheels and the caster wheel forwardly to lift the frame and the implements entirely out of the ground, i. e., moving the parts from the position shown in Figure 2 to the position shown in Figure 3. During the time that the supporting structure is turning, the latch for the caster wheel is released so that free castering movement is provided during turns.

While I have shown and described a preferred embodiment of the invention it is capable of variation therefrom within the scope of the appended claim.

I claim:

In an implement supporting structure trailingly attached to a towing vehicle, comprising in combination, a T-shaped main frame with the leg of the T extending longitudinally and the cross bar of the T located rearwardly and extending horizontally, horizontally disposed journal means secured to said leg at the front end thereof, a horizontal transverse member journaled for rotation in said journal means, said member having a depending portion extending downwardly and rearwardly from each of its ends, said portions being transversely aligned and each carrying a ground wheel, a first transverse supporting element secured to said journal means below the same and parallel to said member, a first pair of ground working implements journaled on said member and fixed to said element with an implement disposed on each side of said leg, a second transverse supporting element secured to said cross bar below and parallel to the same, a second pair of implements secured to said cross bar and second element, a bellcrank having three arms mounted on said cross bar for swinging movement about a transverse axis, one of said arms extending rearwardly and having a ground engaging caster wheel mounted on the same, another arm of said bellcrank projecting upwardly, the third arm of said bellcrank projecting downwardly, a depending arm fixed to said member, a stiff link pivotally connecting said depending arm and said third arm, and means connected between said leg and said upwardly projecting arm of said bellcrank to swing said bellcrank rearwardly and move said wheels forwardly relative to said frame to lift the frame and the implements.

BRUNO DA VALLE.

References Cited in the file of this patent

UNITED STATES PATENTS

| Number | Name | Date |
|---|---|---|
| 37,988 | Van Brocklin | Mar. 24, 1863 |
| 190,460 | Wilson | May 8, 1877 |
| 276,433 | Lee | Apr. 24, 1883 |
| 331,503 | Johnston | Dec. 1, 1885 |
| 364,899 | Clayton | June 14, 1887 |
| 421,410 | Lindgren | Feb. 18, 1890 |
| 479,242 | Campbell | July 19, 1892 |
| 571,307 | Haiman et al. | Nov. 10, 1896 |
| 732,140 | Tinsman | June 30, 1903 |
| 809,233 | Tiemann | Jan. 2, 1906 |
| 980,113 | McKee | Dec. 27, 1910 |
| 1,024,534 | Sucholtz | Apr. 30, 1912 |
| 1,361,906 | Rupprecht | Dec. 14, 1920 |
| 1,381,374 | Waterman | June 14, 1921 |
| 1,740,841 | Smith | Dec. 24, 1929 |
| 1,861,626 | Flatley | June 7, 1932 |
| 1,886,457 | Winkley | Nov. 8, 1932 |
| 1,931,815 | Conley | Oct. 24, 1933 |
| 2,407,094 | Morkoski | Sept. 3, 1946 |
| 2,410,918 | Acton | Nov. 12, 1946 |
| 2,531,557 | Dayton | Nov. 28, 1950 |
| 2,534,798 | Schneider | Dec. 19, 1950 |

FOREIGN PATENTS

| Number | Country | Date |
|---|---|---|
| 39,030 | France | June 1, 1931 |
| | (Addition to No. 668,397) | |
| 668,831 | France | July 22, 1929 |